United States Patent Office 3,167,554
Patented Jan. 26, 1965

---

3,167,554
PIPERAZINO ALKYLAMIDES OF POLYBASIC
CARBOXYLIC ACIDS
Robert Ernst, Los Angeles, Calif., assignor to Textilana
Corporation, Hawthorne, Calif., a corporation of
California
No Drawing. Filed Dec. 7, 1959, Ser. No. 857,500
25 Claims. (Cl. 260—268)

This invention relates to methods of inhibiting corrosion of ferrous metals in the presence of fluids such as brines and oils and is of particular utility in the inhibition of corrosion of casings, liners, tubing and rods employed in petroleum oil wells.

This invention is also directed to novel compositions of matter which are useful for such purposes and for other forms of corrosion inhibition as well as for other uses.

It is one of the objects of my invention to prepare amino amides from piperazine or substituted piperazines and high molecular weight polybasic carboxylic acids.

I have found that a composition of matter having constitutional Formulas I or II or III or mixtures of two or more thereof will give stable dispersions in saline waters and will inhibit corrosion of ferrous metal in contact with such saline waters.

FORMULA I

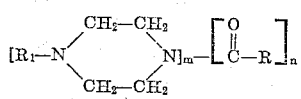

That is, N-acyl (polybasic acid) piperazine.

FORMULA II

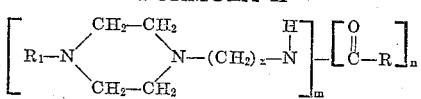

That is, the piperazino alkylamide of the polybasic acid.

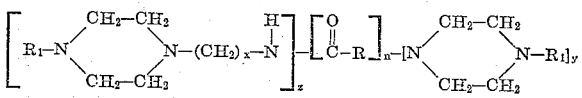

That is, the piperazino alkyl amide of N-acyl (polybasic acid) piperazine.

Each of the above compounds is an amino amide of a polycarboxylic acid, in which there is at least one amino nitrogen, either primary, secondary or tertiary, for each amido nitrogen. In each of the above constitutional formulas $m=n=y+z$, and is equal to at least 2 and is not more than 4, where $y$ and $z$ are each at least 1 and $x$ is at least 2 and not more than 4. These compounds may contain in admixture none or only minor amounts of compounds in which $m$, $n$, and $y+z$ are in excess of 4. In the above constitutional formulas, $O=C-R$ is an acyl radical in which R contains from 17 to 21 carbon atoms and $R_1$ is chosen from the group consisting of hydrogen, alkyl, amino alkyl or hydroxyalkyl groups in which the alkyl radical is of not more than four carbon atoms.

The preferred values of $n$ are 2 or 3, and the best compounds for use in inhibiting corrosion, as will be discussed below, have been those in which the "$n$" value is predominantly 2 with small amounts of those having values of $n=3$, and in which the polyacyl radical is obtained by polymerization of unsaturated fatty acids having $C_{18}$ to $C_{22}$ carbon atoms including the carboxyl carbon.

Such dibasic acid polymers are suitably obtained by well known techniques for the polymerization of unsaturated fatty acids and have been described in U.S. Letters Patent, and literature, to which references are here made. These are included only by way of illustration and example and not as limitations of my invention. The method of forming polybasic acid does not form a part of this invention.

Specific di or polycarboxylic acids of this type have been described by T. F. Bradley, et al. (Ind. Eng. Chem., vol. 32, page 694; vol. 32, page 804; and vol. 33, page 86). Commercially, such products are readily available from processes described, for instance, in U. S. Patent 2,482,761 (C. G. Goebel), also U.S. Patents 2,793,219 and 2,793,220 (F. O. Barrett and C. G. Goebel). Such di and polycarboxylic fatty acids need not be of high purity to produce the compounds of my invention and may contain some of the unreacted monocarboxylic acids. Unrefined, undistilled acid mixtures as produced by this thermal polymerization process are generally satisfactory. For example, such products as produced in U.S. Patent 2,793,220, Examples 1 to 7, or U.S. Patent 2,793,219, Example 9, without further refinements such as distillation to remove the unreacted residual monocarboxylic acids can be utilized, even though the relatively monomer free form of dimer, trimer and polymer acids are preferred.

These processes cause the polymerization of unsaturated fatty acids of $C_{18}$ to $C_{22}$ carbon atoms, or esters thereof, of vegetable oils, marine oils, animal oil or oil of synthetic origin. For example, such polybasic acids may be obtained by polymerization of oleic, linoleic, ricinoleic, linolenic and linoelaidic and other singly or doubly unsaturated fatty acids of suitable chain length, or of their esters.

The structure of these polybasic acids has not been fully elucidated, nor is it fully established whether they are polymerized by a fre eradical or by a Diels-Alder mechanism.

The following is one possible scheme of these structures, assuming a conjugated doubly unsaturated acid. But it may not be the exclusive structures, and is given only for illustrative purposes.

The dimeric polymers:

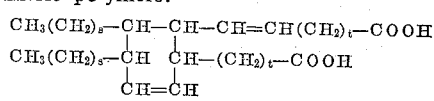

The trimeric form:

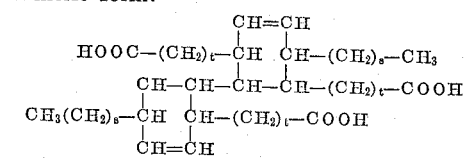

The tetramer form would require a further reaction where the double bond of the reactive acid and trimer combine to form a tetramer presumably having a three ring structure.

For purposes of distinction from other polybasic acids of high molecular weight, the polymer acids referred to above are characterized in that each pair of carboxyl group is separated by relatively long carbon to carbon chains.

For example, these acids may be obtained by suitable polymerization of linoleic acid to produce polymers containing about 85% dimer, i.e., dilinoleic acid, and about 12% of trimer, i.e., trilinoleic acid, and about 3% of the monomer, i.e., linoleic acid, as referred to in the Fischer U.S. Patent 2,805,201.

Another polymeric acid is the "dimer acid" sold by Emery Industries, Inc., as Emery 3079S, composed of about 95% dimer acid (dilinoleic acid), about 4% of trimer acid (trilinoleic acid) and 1% of monobasic acid (linoleic acid). A very suitable and low cost raw material is the by-product from the caustic fusion of castor oil for the production of sebacic acid.

The diamines employed in the amidification of the above polybasic acids are preferably the dibasic heterocyclic diamines and preferably the piperazines and substituted piperazines having the constitutional formula

FORMULA IV

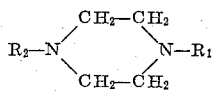

Where $R_1$ is hydrogen or amino alkyl and $R_2$ is chosen from the group consisting of hydrogen, alkyl, amino alkyl or hydroxyalkyl in which the alkyl radical is of not more than four carbon atoms.

Typical examples of these compounds are, for instance:

N-methyl piperazine

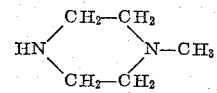

N-hydroxyethyl piperazine

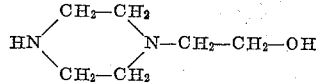

N-(2-aminoethyl) piperazine

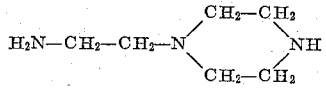

N-(3-aminopropyl) piperazine

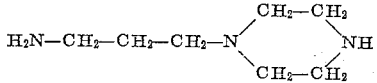

1(methyl)4(3-aminopropyl) piperazine

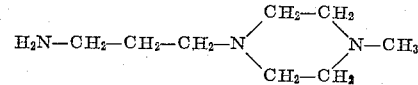

1,4-piperazine bis propylamine

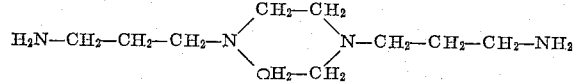

1($\beta$-hydroxyethyl)4(3-aminopropyl) piperazine

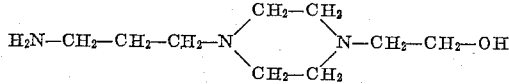

The ethyl propyl and butyl homologues of the above listed compounds may be used. Mixtures of two or more of the above may also be employed in forming the amino amide of the polybasic acids of my invention.

I may use the unpurified commercial products containing mixtures of one or more than one of the above piperazine and the alkyl, aminoalkyl, and hydroxyalkyl substituted piperazines, or purify them to separate some or all of the several components into any desired degree of purity and employ such fractions to produce the amino amides of my invention. The method of forming the piperazine or substituted piperazine is not a part of the invention of this application.

The compounds of my invention may be prepared, for example, by way of further description and not as a limitation, by the following procedures.

I react the piperazine or substituted piperazine with the polybasic acid referred to above, employing more than one mole of the piperazine or substituted piperazine per carboxyl radical, to cause amidification of only one of the amine nitrogens of the piperazine or substituted piperazine employed. It is desired that the resultant amide be an amino amide wherein there is at least one amino nitrogen for each amide nitrogen. The reaction results in the formation of the compound Formula I when the substituent $R_1$ in Formula IV is hydrogen, alkyl or hydroxy alkyl, or Formula II or Formula III or a mixture of Formulae II and III when the substituent $R_1$ in Formula IV is hydrogen, alkyl, alkylamine or hydroxyalkyl and the substituent $R_2$ is alkylamine.

Where the piperazine is substituted by an hydroxyalkyl group, the amidification is carried out under conditions to inhibit esterification of the hydroxyl group by the carboxyl group. The products produced contain but a few percent, generally less than 5% by weight, of the esters.

In order to obtain the most desirable water or brine dispersibility, the amidification reaction is preferably carried to completion as far as practicable in order to amidify the available carboxyl-carbonyl groups. The unreacted polybasic acid is not dispersible in water or brine, and in order to obtain as little unreacted acid as is practicable, the reaction is carried out with an excess of the piperazine or substituted piperazine.

These conditions of reaction will be more fully understood by those skilled in the art from the examples given below.

Such compounds are readily soluble or dispersible in colloidal state in water and in heavy brine and in aromatic and oxygen bearing solvents, such as, for example, toluol, xylol, ethyl alcohol, methyl alcohol, isopropyl alcohol, ether alcohols and polyglycols and other conventional oxygenated solvents, to give dispersions, including within the term molecular dispersions, i.e., solutions and colloidal dispersions, which are stable, i.e., will not precipitate at ambient temperatures and at even high temperatures, such as the boiling point of the dispersion. They have a low viscosity, do not gel, and foam only moderately. They are effective surfactants, being cationic in nature.

While I do not wish to be bound by any theory of the action of my compounds of my invention in hibiting corrosion of ferrous metals in the presence of brines and oils, the following is given as an explanation thereof:

The compounds of my invention preferentially wet ferrous metals, to provide tightly adhering, continuous hydrophobic coatings. The film produced when the metal is wetted is resistant to stripping by the saline waters or oil. But the film, being oleophyllic, is easily wetted by oil; and thus, in the presence of oil and brine, the metal, when wetted by the inhibitor, is also coated by a tightly adhering oil film which further protects the metal. The surfactant acts as the primer or undercoat for the oil film. The oil will not strip the film from the metal because of the low solubility of the compounds in oil such as petroleum oil.

The compounds are dispersible in water and brine in concentrations which range up to 10,000 parts per million of the water, depending on the compounds employed, and the dispersions are not precipitated by monovalent ions such as Na or K or by polyvalent cations such as calcium or magnesium, and thus give stable dispersions in brines usually formed in oil wells. Additionally, because of their basicity, they are not precipitated by the acidity often found in such oil well fluids, as for example that arising from $H_2S$ or $CO_2$ present in the oil well fluids.

Solutions in both brine and water of the compounds described, when tested at a concentration of 0.5% by weight of the aminoamides of my invention, or certain of the water soluble salts of these compounds, exhibited a reduced surface tension of approximately from 32 to 42 dynes/cm. at 25° C. as compared to distilled water of 72 dynes/cm. when measured on a Du Noüy Surface Tensiometer.

It should be pointed out that, owing to the good water dispersibility of the bases themselves, salts with water solubilizing acids need not be formed. For practical application, however, the following acids are enumerated as examples of acids that are suitable to retain the water and brine solubility or improve the stability of the dispersion where the salts of such bases rather than the bases themselves are preferred to be used as the corrosion inhibitors:

Alkylmonocarboxylic acids: Formic, acetic, propionic, butyric, isobutyric, valeric acids.

Hydroxyalkylcarboxylic acids: Glycollic, lactic, hydroxypropionic, hydroxybutyric acids.

Di and polycarboxylic acids: Malonic, succinic, glutaric, adipic, fumaric, maleic, citric, tartaric, gluconic, malic acids.

The neutralization of the amino amide described above may be carried out in a suitable solvent such as, for instance, aqueous alcoholic solution, to promote the removal of heat developed during neutralization and prevent side reactions such as amidification with the acids enumerated above. Such procedure is useful where hydrogen substituted amine groups are available for reaction, and to inhibit possible reaction with double bonds of the highly reactive unsaturated acids, such as crotonic acid, fumaric or maleic acid, where such acids are employed.

Acids other than the carboxylic or polycarboxylic acids can be resorted to in forming desirable salts of the amino amides described above.

The following examples are given by way of illustration and not as a limitation of my invention.

*Example 1.—Preparation of bis-(piperazino ethyl) amide of dimer fatty acid*

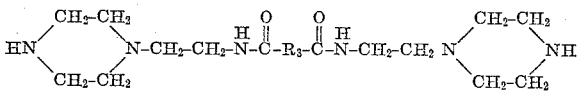

Where $R_3$ is fatty residue of dimer acid described below.

Into a 4,000 ml. resin reaction apparatus (Scientific Glass Apparatus Co., J4400) equipped with vacuum tight stirring assembly, thermometer, insulated funnel, Claisen distilling head connected to a distillate collector and vacuum pump, is charged:

12 moles, equal to 1550.4 grams, aminoethyl piperazine (M.W. 129.2, sp. gravity 20° C. 0.984; refractive index 20° C. 1.4999; and a distilling range at 760 mm. Hg of 214.8–221.8° C.).

This was heated to 300–320° F. with the electrical heating mantle, while mildly purging with nitrogen gas.

3 moles, equal to 1,749.6 grams "dimer acid" Emery 3079S, referred to above (acid value 192.4 and containing about 95% dimer acid, 4% trimer acid, and 1% monobasic acid, refractive index at 25° C. 1.4845), were warmed separately to about 200° F. and were then added to the aminoethyl piperazine at 310–320° F. over a period of about 4–5 hours through the insulated funnel. At this point, 45 ml. of distillate were collected, and after an additional two hours of heating at the indicated temperature, the acid number had fallen below 6, and 80 ml. distillate had collected. Heating under nitrogen atmosphere was continued for 6 additional hours at this temperature, and after collecting 101 ml. distillate, the acid number had fallen to 2.7. Holding the temperature at about 320° F., a vacuum was now applied, reducing the pressure inside the reactor to 12 mm. Hg, gradually, so as to prevent excessive foaming. Within 3¼ hours, 725 grams of the 775 grams excess aminoethyl piperazine had been removed, and the acid number had fallen further to 1.87. A minor amount of aminoethyl piperazine appears to have complexed during the reaction, or was difficult to remove, as is also indicated by the yield of 2,466 grams, versus 2,417 grams theory. As will be seen in additional examples, excess amine may be left in the product, or may be stripped only partially where desired. The resulting compound (substantially: bis (piperazinoethyl) amide of dimer acid) was a pale, amber, viscous, resinous liquid, with a viscosity at 100° F. of 14,400 cps., spindle 5, 20 r.p.m. Total nitrogen calculated as 10.4, was found to be 10.94 by method of Kjeldahl. 50% of the above compound, 25% water, and 25% isopropanol formed an easy to handle, clear liquid concentrate. 40 grams of this concentrate dissolved in 3960 grams water formed a hazy, stable, mildly foaming solution, having a viscosity of 4 cps., spindle 1, at 20 r.p.m. (Brookfield Synchrolectric Viscometer). The surface tension at 25° C. was measured at 35.6 dynes/cm.

The excellent corrosion protective properties of this compound and its salts will be demonstrated below.

*Example 1–A*

The glycollic acid salt of the bis(piperazinoethyl) amide of dimer acid, as per Example 1, was prepared as follows:

135.5 grams of product of Example 1 was dissolved in
57.2 grams of isopropanol and
98.0 grams of distilled water. There was then added at a slow rate
54.3 grams of glycollic acid (70% soln. in water) so as to avoid excessive heat development. The temperature was so held under 140° F., although higher temperatures (below temperatures resulting in amidification) would not harm.

The salt had a solids content of about 50% and a pH of 5.5 and was a clear liquid. Experience has shown subsequently that a somewhat higher pH of about 6–8 will be preferable. This compound at the lower pH nevertheless gave outstanding corrosion protection, as may be seen from the table below.

*Example 2.—Preparation of bis [1-acyl (dimer acid)- 4-methyl] piperazine*

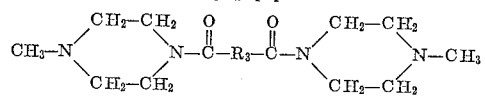

Where $R_3$ is residue of dimer acid described.

Into a 1,000 ml. 3 neck distilling flask, equipped with heating mantle and other accessories mentioned in Example 1, but with a hot water jacketed reflux condenser, inserted between the flask and Claisen distilling head, is charged:

1.75 moles, equivalent to 175.3 grams of N-methylpiperazine (molecular weight 100.1; purity 99.5%; specific gravity at 20° C. 0.904; refractive index 20° C. 1.4652; distilling range at 760 mm. Hg of 135.3–142.6° C. (ASTM). This was heated while purging with nitrogen and adding 0.7 mole, equal to 408.2 grams of the previously warmed dimer acid described in Example 1.

In this case, addition can be made at as rapid a rate as permissible, since only the secondary amine group is reactive and polymerization into polyamides of large chain length is not possible.

After 22 hours of reaction time at 264–270° F., reaction had gone to completion to about 96%, and the small amount of excess N-methyl-piperazine still remaining in the reaction product was retained therein without distilling off. Much of the initially charged excess had been retained, as was determined by the final amine equivalent weight found by titration.

Theoretical amine equivalent weight based on original charge: 266. Found: 280.

A fully vacuum stripped compound would have the amine equivalent weight of about 374.

The resulting compound was a resinous, pale amber, viscous liquid, but substantially more fluid than the compound of Example 1.

50% of the above compound,
25% isopropanol and
25% water
formed an easy to handle, clear oil.

40 grams of this concentrate was then dissolved in 3960 grams of distilled water, yielding a stable, hazy, moderately foaming solution, having a viscosity of 6 cps. and a surface tension of 33.5 dynes/cm. at 25° C. A like concentration (0.5% actives) in brine was equally stable, similar in appearance, showed a viscosity of 5 cps. and a surface tension of 32.2 dynes/cm. at 25° C. The table below is indicative of its excellent corrosion protective properties.

*Example 3.—Preparation of bis [1-acyl (dimer acid)-4-beta hydroxy ethyl] piperazine*

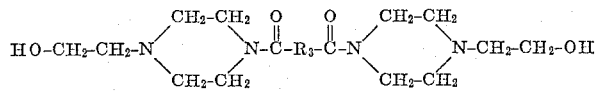

Into an apparatus as described in Example 2, but not equipped with the hot water jacketed reflux condenser, was charged:

1.75 moles equivalent to 227.8 grams of N-(beta hydroxyethyl)piperazine (mol. weight 130.2; spec. gravity 1.0610; @ 20° C.; refractive index at 20° C. 1.5063; boiling range 240°–260° C. (ASTM)).

This charge was then heated to 320° F. while purging with nitrogen. Through the insulated funnel was then added:

0.7 mole equivalent to 408.2 grams of the dimer acid described in Example 1.

The dimer acid had been warmed to about 200° F. to improve its flow. Addition of the dimer acid was made over a period of 4½ hours, and at the end of this period, the reaction had proceeded to in excess of 50% completion. Heating under constant agitation and purging with nitrogen was continued at this temperature (320°–322° F.) at which time over 22 grams of distillate had been collected, while the acid number had fallen to 4.6. The excess hydroxyethyl piperazine was not removed. There was obtained a yield of 601 grams (theory: 610.8 grams). The resultant product was of a light amber, viscous liquid, having an amine equivalent weight of 284 (theory: 290.8, including the excess amine charged). The close values on amine equivalent of practice versus theory obtained by titration indicated that substantially only this bis N-acylated hydroxy ethyl piperazine had formed and that esterification was held to the minimum. Subsequent scanning of the compound on an infrared spectrophotometer showed only trace quantities of ester present as evidenced by a minor peak at 5.74 microns, and a massive peak at 6.05–6.1 microns typical for amide.

As in the previous case, there was prepared a 50% solution in alcohol and water, and the clear liquid resulting was introduced into distilled water and brine solution to examine solubility, viscosity, and performance as to surface activity.

An 0.5% by weight solution (active basis) dissolved in distilled water to give a mildly foaming opalescent to hazy solution, having a viscosity of 5 cps. and a surface tension of 42.8 dynes/cm. at 25° C. Solution in brine showed excellent stability as well; was hazy in appearance, conformed to a viscosity of 6 cps. and gave a surface tension of 32.4 dynes/cm., much lower than the surface active properties obtained in distilled water. Again, the powerful corrosion protective properties may be noted in the accompanying tables.

*Example 4.—Preparation of bis (1-methyl piperazino propyl) amide of dimer acid*

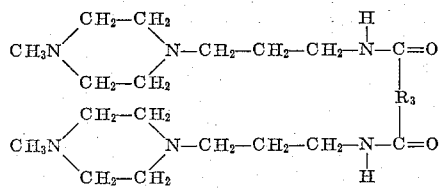

Into a 1,000 ml. 3 neck flask, equipped as in Example 2, but without the insulated funnel, was charged:

½ mole, equivalent to 291.6 grams dimer acid as used in Example 1, and 1.1 moles, equivalent to 173.0 grams of 1-methyl 4-(3-aminopropyl) piperazine (refractive index 1.4812 at 22° C.; boiling point 225° C. at 760 mm. Hg), the amine having been derived by reaction of acrylonitrile upon N methyl-piperazine, followed by reduction in methanol in the presence of liquid ammonia and Raney nickel catalyst (under hydrogen pressure).

Both reagents were charged at once and heated to 330° F. gradually, over a period of 9 hours and held there for an additional 4 hours. At this point, the acid number had fallen to a value of 4.9, and a vacuum was then applied to a reduced pressure of 4 mm. Hg for 2 hours, to strip the slight excess amine. The acid number had fallen further to 1.9. A yield of 427 grams was obtained, comparing with a theoretical yield of 430.6 grams. Total nitrogen by method of Kjeldahl was found to be 9.48% as against theory of 9.76%.

The product was a light amber, viscous oil, materially more fluid than the compound of Example 1. An 0.5% by weight solution of this compound was hazy, mildly foaming, and stable, and had a surface tension of 37.5 dynes/cm. and a viscosity of 5 cps., and generally resembled the compound of Example 1, except for its lower viscosity in the 100% form, measured as 8,300 cps., spindle 4, 20 r.p.m., Brookfield Synchrolectric Viscometer at 100° F.

*Example 5.—Preparation of poly (piperazino ethyl) amide of crude polymer acid described below*

Into an apparatus as described in Example 1 were charged:

8 moles, equivalent to 1,033.6 grams of N-(2 aminoethyl) piperazine. The temperature was then brought to 320° F. and there was added over a period of about 5 hours 4 times the equivalent weight of 381 (as determined from an acid number of 147.2) of the polymerized linoleic acid obtained as the co-product in the manufacture of sebacic acid by caustic fusion of castor oil, described in previous pages and available from Rohm & Haas Company as Acid VR-1. It is the high boiling material remaining after distillation of sebacic acid, capryl alcohol and other more volatile acids. It is understood to be a polymerized linoleic acid consisting principally of dimers, trimers and tetramers, etc. The material has an average molecular weight in the range of 1000, containing fractions of molecular weight in the range of 300–1300. The iodine value ranges from about 40–70. The acid number is in the range of 145–180. The average functionality is equal to about two carboxylic groups per molecule, and behaves like a dibasic acid in the amidification reaction of this example.

After 6 additional hours following completion of addition, the acid number had fallen to a value of 4.0. The batch was then partially stripped to an amine equivalent weight of 219 by titration, leaving about 217 grams of the excess aminoethyl piperazine in the final product. This checked well with the yield of 2,178 grams obtained against theory of 1,968 grams of product expected after complete stripping and the theoretical amine equivalent weight of the partially stripped batch calculated as 215.

The resultant compound was dark brown in color, had a final acid value of 2.4, and gave a viscosity of 21,800 cps., spindle 5, at 10 r.p.m., at 100° F.

An 0.5% by weight solution of this compound in distilled water gave a surface tension of 34.5 dynes/cm. at 25° C. and a viscosity of 5 cps., while an 0.5% solution in brine registered a surface tension of 32.4 dynes/cm. at 25° C. and showed a viscosity of 6 cps. Both solutions were stable, hazy in appearance and mildly foaming. The compound otherwise resembled in all respects the compound of Example 1.

*Example 6*

Proceeding as in Example 5, and utilizing the same equipment, there were charged: 15 times the equivalent weight plus 10%, equalling 974 grams of a co-product obtained from a commercial continuous operation in the manufacture of piperazine, having the following approximate composition:

| | Percent |
|---|---|
| N-amino ethyl piperazine | 38 |
| N-hydroxy ethyl piperazine | 12 |
| High molecular weight complexes of the above | 40-45 |

Minor quantities of other amines.

This mixture of the crude piperazine derivatives had an amine equivalent weight of 59 by titration. The amine was now heated to 320° F. and, proceeding as in Example 1, there were slowly added at this temperature 5 times the equivalent weight, equal to 1,882.5 grams of the VR 1 acid as described above and having an acid value of 149. The reaction mass was brought to an acid number of 4.8 after heating for 12 hours at top temperature, and the dark brown substance gave an amine equivalent weight of 248 upon titration. The viscosity was somewhat higher than that obtained with Example 5.

This compound was now dissolved in isopropyl alcohol and neutralized with 70% glycollic acid to a pH of about 7, whereupon it was further diluted to 20% actives (based upon the salt) with water. The brown, low viscosity solution readily dissolves in water or brine to give moderately foaming stable solutions exhibiting pronounced surface active properties. An 0.5% solution of this glycollic acid salt in brine gave a surface tension of 36.8 dynes/cm. at 25° C., a value which proved almost identical to the value found with the similar compound of Example 5. The compound of Example 5 as the glycollic acid salt showed, however, even higher solubility in brine, producing perfectly clear solutions in brine at 0.5% concentrations.

Where this greater solubility in brine is desired, one may increase the excess of this crude piperazine derivative initially charged based upon equivalent values of amine versus acid used in the initial condensation reaction. From the table below and practical experience noted, one will readily deduce the outstanding effectiveness of this composition described in Example 6.

Where lighter colored products are desired than obtainable with the crude co-product used in Example 6 as the piperazines, the co-product can be bleached with bleaching clays and followed by filtration, or flash distilled to produce like products, but containing 60–70% N-aminoethyl piperazine and about 8–10% N-hydroxyethyl piperazine, with less than 10% of high molecular weight homologues and only small amounts of other amine contaminates. This may be used in place of the piperazines employed in Example 6.

In the above Example 6, the resultant product may contain a mixture including poly [1-acyl (polymer acid)-4-beta hydroxy ethyl] piperazine similar to the form of compound produced in Example 3, and poly (piperazino ethyl) amide of the polymer acid similar to Example 4, and the piperazino ethyl amide of N-acyl (polymer acid) hydroxy ethyl piperazine by the amidification of the polymer acid by both the hydroxy ethyl piperazine and the amino ethyl piperazine. Where the poly acid is predominantly dimer, the first two compounds will be a bis compound, the acyl radical being the dilinoyl radical, and the third named compound may be illustrated by the following formula:

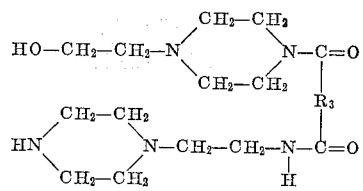

Where $R_3$ as above is the carbon chain radical of the polymer acid employed. Higher molecular weight amine complexes also amidify the polybasic acid to form high molecular weight amino amides. As in the previous examples, in the case of the dilinoleic acid, $R_3$ is $C_{34}$, due to the amidification of the dilinoleic acid. In all of the above examples the presence of tetramer and trimer forms of the polybasic acid will give rise to minor amounts of higher molecular weight complexes due to the amidification reactions with the three carboxyl groups of the trimer or four carboxyl groups of the tetramer.

The amino amides of the polybasic acid in which the monomer acyl radical is $C_{18}$ to $C_{22}$ are extremely effective corrosion inhibitors in the presence of water or brines and are equally effective in waters and brines containing $H_2S$ or $CO_2$ acidity, and will also inhibit corrosion effectively in the presence of petroleum gases and oils. They are thus of utility in the inhibition of corrosion in oil wells and petroleum pipe lines and in storage equipment. They are also useful for any ferrous metal corrosion inhibition, particularly protection of corrosion of ferrous metals in contact with waters containing salts, for example, the salts of the alkali metals or alkaline earth metals.

The effectivness of the compounds of my invention as corrosion inhibitors will appear from the following:

*Example 7*

The brine solution used to test the solubility of the corrosion inhibition had the following composition:

95.8% distilled water
4.0% sodium chloride and
0.2% calcium chloride.

The following procedure was used to determine the effectiveness of the compounds enumerated above:

Polished steel rods 6" long, ½" diameter (S.A.E. 1018) are finished off with 180 fine emery cloth and are then stored in pentane until ready for use. Two test specimens are then accurately weighted and mounted side by side on the head of a rocking autoclave having a little over 4 liter capacity. 3,900 ml. of a well evacuated 3½% NaCl solution in tap water is now charged into the autoclave, along with 200 ml. of an evacuated kerosene (employed as the hydrocarbon phase). The corrosion inhibitor was now added, using 6.8 parts per million (p.p.m.) where the salts of the amino amides described above were the compounds tested, and 5.7 p.p.m. where the amino amide bases themselves were used. The autoclave was then closed and purged with $CO_2$, finally charged with 20 p.s.i.g. pressure of $CO_2$ and heated under pressure for 24 hours.

The rods are then removed again, washed and weighed to determine the weight loss, if any.

This test procedure is basically the procedure described in U. S. Patent 2,805,201, Paul W. Fischer (see column 3). The salt content was increased and the inhibitor concentration reduced to increase the severity of the test and bring results closer to extreme conditions existing in the fields.

The efficiency is determined by the following formula:

$$\text{Efficiency} = \frac{(W_1 - W_2) \times 100}{W_1}$$

Where $W_1$ is the loss in specimen weight with no inhibitor present and $W_2$ is the loss in specimen weight where the inhibitor under test is employed.

Where the test showed an appreciation in weight, this was treated as an impurity or soil, and the result was treated as if no loss in weight occurred. Where two tests were run on any samples, the results were averaged.

The results are tabulated in the following Table I.

TABLE I

| Inhibitor Tested | Concentration in p.p.m. | Milligram Specimen weight loss or gain | | Percent Protection |
|---|---|---|---|---|
| | | I. Test | II. Repeat Test | |
| Blank—no inhibitor | | −1,244 | −1,354 | 0 |
| Compound Example 1 (base) | 5.7 | −28 | | 97.8 |
| Compound Example 1-A (Salt, Glycollate) | 6.8 | −16 | | 98.8 |
| Compound Example 2 (base) | 5.7 | +1.8 | −11.4 | 99.1 |
| Compound Example 3 (base) | 5.7 | −18 | | 98.6 |
| Compound Example 3 (Salt, Acetate) | 6.8 | −33 | | 97.4 |
| Compound Example 6 (Salt, Glycollate) | 6.8 | −5.4 | +16.8 | 99.5 |
| Bis (Piperazino ethyl Amide of Azelaic Acid (Salt, Acetate) | 6.8 | −992 | | 23.7 |
| Bis (Piperazino ethyl) Amide of Dodecenyl Succinic acid (Salt, Acetate) | 6.8 | −882 | −910 | 31.08 |

Attention is called to the specific nature of the chain length of the polybasic acids as affecting the performance of the compounds as corrosion inhibitors.

In order to evaluate the influence of the chain length of the polybasic acids, on the corrosion inhibition effectiveness of the amino amides of the polymer acids employed in Examples 1–6 as compared to the amino amides of dibasic acids of smaller chain length, i.e., lower molecular weight, amino amide analogues of such lower molecular weight acids were prepared and similarly tested. Thus, amides formed from the piperazines according to Formula IV to give compounds according to Formulas I to III, where the acyl group is derived by amidification of azelaic, adipic, sebacic, or of dodecenyl succinic acid or dodecenylsuccinic anhydride as by amidification by piperazines of Formula IV, produce amino amides which are of such low order of corrosion inhibition as not to be of practical value as corrosion inhibitors, particularly when considered for use in oil wells.

Thus, for example, the acetate salt of bis (piperazino ethyl) amide of azaleic acid and the acetate salt of bis (piperazino ethyl) amide of dodecenyl succinic acid, when tested according to the test procedure of Example 7, gave the results shown in Table I.

Experience in the field, particularly in the protection of oil field equipment and in oil wells, has shown that the higher the efficiency by the above test the less the amount of inhibitor required and the longer is the period of effectiveness, and the greater the degree of inhibition. In fact, in oil field practice, it has been found that an efficiency of at least 90% is desirable for an inhibitor to be commercially of interest. Preferred are compounds which show at least 95% efficiency by the above test.

The degree of effectiveness of the compounds of my invention is shown by the 97.4% to 99.8% efficiency scored by these compounds in the above tests, as shown in the table.

Because of their dispersibility in water and stability in oil well brines and low solubility in petroleum oils, they may be used with high degree of effectiveness where the well is producing water and even where the "cut" is extremely high in water. They may also be used with great effectiveness in wells which do not produce water or only insubstantial amounts thereof.

Thus, in gas and condensate wells having an open annulus, the material may be inserted through the open annulus as a water dispersion or solution in an organic solvent. Addition may be made over a period of time until the test of the effluent liquid shows a low iron content, and thereafter periodic additions may be made.

In gas and condensate wells which do not have an open annulus, the conventional "slug" method may be employed. A volume of water dispersion or solution in an organic solvent of the inhibitor is injected into the well and the well shut in for a sufficient length of time to allow the dispersion to reach the bottom.

In flowing or pumping wells, which either are dry oil producers or have low or high water "cuts," the wells may be protected against corrosion by injecting the water dispersion or solution in an organic solvent of the inhibitor, either periodically or continuously, until the iron content in the circulating fluid has been reduced to the desired concentration. Thereafter the introduction may be made periodically.

The addition may be made by continuous injection into the annulus or by the slug method described above.

In making the water dispersions, brines separated from the crude oil may be employed to dilute the concentrate.

The utility of the inhibitors previously described will appear from the following examples.

*Example 8*

The composition of water of Example 6, in the form of the glycollic acid salt, was dissolved in one part of isopropyl alcohol and 3 parts of water to form a solution containing 20% by weight of the salt. This solution was diluted with several barrels of water and injected by the slug method into a pumping well producing 800 barrels per day of fluid containing 93% brine. The amount of inhibitor injected per day was equal to 10 parts per million of the glycollic acid salt based on the total mixed fluid of brine and oil produced; that is, a total of about 2.8 pounds of the glycollic acid salt was injected into the well each day, using the slug method. Prior to the injection of the inhibitor the iron content of the 800 barrels equalled 4 pounds by chemical analysis. After a few days' treatment the total iron content of the 800 barrels produced in each day was only 0.75 pound. This low iron loss continued for the period of test, which was a period longer than six months. A portion of that iron loss contained in the effluent after treatment must be accounted for by the normal iron content of the oil and brine produced by the formation.

*Example 9*

Another well producing 300 barrels per day of oil and brine containing about 85% brine was similarly treated, using, however, 11.75 parts per million; that is, about 1.23 pounds of the glycollic acid salt each day. Before treatment the iron content of the 300 barrels produced each day was 3.45 pounds of iron, and after treatment the iron content of the 300 barrels produced each day was only 0.46 pound per day.

The term "consisting essentially of" as used in the definition of the ingredients present in the compositions claimed is intended to exclude the presence of other materials in such amounts as to interfere substantially with the properties and characteristics possessed by the composition set forth but to permit the presence of other materials in such amounts as not substantially to affect said properties and characteristics adversely.

While I have described particular embodiments of my invention, it should be understood that various modifications and adaptations thereof may be made within the spirit of the invention as set forth in the appended claims.

I claim:

1. An amino amide compound chosen from the group consisting of N acyl (polybasic acid) piperazine and water dispersible salts thereof, the piperazino alkylamide of a polybasic acid and water dispersible salts thereof, and the piperazino amide of a polybasic acid and water dispersible salts thereof, the acyl radical of said polybasic acid corresponding to the formula $-(O{=}C{-}R)_n$, where R contains from 17 to 21 carbon atoms and $n$ is at least 2 and is not more than 4 and in which the R radical contains carbon-carbon chains that separate the C=O carbonyl groups, each carbonyl group of said polybasic acid being amidified.

2. The compound of claim 1, in which the amino amide is the amino amide of a polymer of an unsaturated fatty acid having an unsaturated fatty acid radical of 17 to 21 carbon atoms.

3. The compound of claim 2, in which the polybasic acid consists essentially of the dimer of linoleic acid.

4. The compound of claim 2, in which the polybasic acid consists essentially of a mixture of the dimer and trimer of linoleic acid.

5. An amino amide compound chosen from the group consisting of N-acyl (polybasic acid) piperazine of the formula

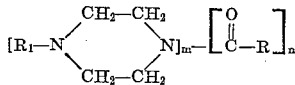

and salts thereof, a piperazino alkylamide of a polybasic acid according to the formula:

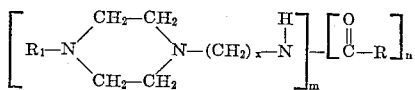

and salts thereof, and a piperazino alkylamide of N-acyl (polybasic acid) piperazine, according to the formula:

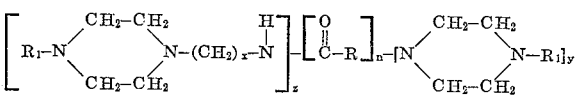

and salts thereof, in which, in each formula, there is at least one amino nitrogen for each amide nitrogen and in which $m$, $n$, $y+z$ are each equal to at least 2, $y$ and $z$ are each at least 1, and $x$ is at least 2 and not more than 4, and in which R contains from 17 to 21 carbon atoms and $R_1$ is chosen from the group consisting of hydrogen, alkyl, amino alkyl and hydroxyalkyl group in which the above alkyl radical in the above alkyl and substituted alkyl groups are each of not more than 4 carbon atoms.

6. The compound of claim 5, in which the amino amide is the amino amide of a polymer of an unsaturated fatty acid having an unsaturated fatty acid radical of 17 to 21 carbon atoms.

7. The compound of claim 6, in which the polybasic acid consists essentially of the dimer of linoleic acid.

8. The compound of claim 6, in which the polybasic acid consists essentially of a mixture of dimer and trimer of linoleic acid.

9. A composition of matter chosen from the group consisting of bis (piperazino ethyl) amide of dimer of a $C_{18}$ to $C_{22}$ unsaturated fatty acid and its water dispersible salts.

10. A composition of matter chosen from the group consisting of, bis [1-acyl (dimer) 4-methyl] piperazine wherein the (dimer) is a dimer of the acid radical of a $C_{18}$ to $C_{22}$ unsaturated fatty acid and its water dispersible salts.

11. A composition of matter chosen from the group consisting of, bis [1-acyl (dimer) 4-beta hydroxy ethyl] piperazine wherein the (dimer) is a dimer of the acid radical of a $C_{18}$ to $C_{22}$ unsaturated fatty acid and its water dispersible salts.

12. A composition of matter chosen from the group consisting of, bis (1-methyl piperazino propyl) amide of dilinoleic acid and its water dispersible salts.

13. A composition of matter chosen from the group consisting of amido amides and the water dispersible salts of amido amides, said amido amides consisting essentially of a mixture of poly [1-acyl (polymer acid) 4-beta hydroxyethyl] piperazine, bis (piperazino ethyl) amide of polymer acid, and piperazino amide of N-acyl (polymer acid) hydroxyethyl piperazine wherein (polymer acid) is a polybasic acid of which the acyl radical corresponds to the formula $-(O{=}C{-}R)_n$, where R contains 17 to 21 carbon atoms and $n$ is at least 2.

14. A method of forming amino amides of polybasic acids which comprises reacting at an elevated temperature a piperazine having the constitutional formula

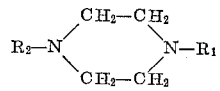

where $R_1$ is hydrogen or amino alkyl and $R_2$ is chosen from the group consisting of hydrogen, alkyl, amino alkyl and hydroxy alkyl, in which the alkyl radical of the alkyl substituent of the piperazine is of not more than 4 carbon atoms, with an unsaturated fatty acid polymer having an acyl radical

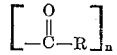

where R contains about 17 to about 21 carbon atoms and $n$ is an integer equal to at least 2 and not more than 4, the molar ratio of said reactants being at least $n$ moles of the piperazine per mol of the polybasic acid and providing one mole piperazine for each carboxyl group, amidifying only one of said groups $R_2$ and $R_1$ to produce an amino amide containing an amino nitrogen for each amide nitrogen and continuing said reaction until substantially all of the acyl radicals in said polybasic acid have been amidified.

15. The process of claim 14, in which said $R_2$ is hydroxyalkyl and said amino amide contains less than 5% by weight of the hydroxyalkyl piperazine ester of said polybasic acid.

16. A composition of matter chosen from the group consisting of amido amides and the water dispersible salts of amido amides, said amido amides consisting essentially of a poly (piperazino ethyl) amide of polymer acid.

17. The composition according to claim 16, in which the polymer acid consists essentially of the dimer of linoleic acid monomer.

18. The method of claim 14, in which said unsaturated fatty acid polymer is the polymer of linoleic acid.

19. The method of claim 18, in which the polymer contains dilinoleic and trilinoleic acids.

20. The method of claim 19, in which the piperazine is amino ethyl piperazine.

21. The method of claim 19, in which the piperazine is N-methyl piperazine.

22. The method of claim 19, in which the piperazine is N-(beta-hydroxy ethyl) piperazine.

23. The method of claim 19, in which the piperazine is 1-methyl-4-(3-amino propyl) piperazine.

24. The method of claim 19, in which the piperazine is N-(2-amino ethyl) piperazine.

25. The method of claim 19, in which the piperazine is a mixture of N-amino ethyl piperazine and N-hydroxy ethyl piperazine, containing also high molecular weight complexes of said piperazine derivatives.

References Cited in the file of this patent

UNITED STATES PATENTS

| | | |
|---|---|---|
| 2,541,584 | Jacoby | Feb. 13, 1951 |
| 2,574,407 | Malkemus et al. | Nov. 6, 1951 |
| 2,598,213 | Blair | May 27, 1952 |
| 2,718,503 | Rocchini | Sept. 20, 1955 |
| 2,727,003 | Hughes | Dec. 13, 1955 |
| 2,752,221 | Wachter et al. | June 26, 1956 |
| 2,839,465 | Jones | June 17, 1958 |
| 2,935,474 | Seale et al. | May 3, 1960 |

IRVING MARCUS, *Primary Examiner.*

J. GREENWALD, WALTER A. MODANCE, *Examiners.*